(12) United States Patent
Sokolov et al.

(10) Patent No.: US 7,020,874 B2
(45) Date of Patent: Mar. 28, 2006

(54) TECHNIQUES FOR LOADING CLASS FILES INTO VIRTUAL MACHINES

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 595 days.

(21) Appl. No.: 09/818,097

(22) Filed: Mar. 26, 2001

(65) Prior Publication Data
US 2004/0015935 A1 Jan. 22, 2004

(51) Int. Cl.
*G06F 9/44* (2006.01)
(52) U.S. Cl. .................................... 717/166
(58) Field of Classification Search ............... 717/166
See application file for complete search history.

(56) References Cited

U.S. PATENT DOCUMENTS

| | | | |
|---|---|---|---|
| 4,086,626 A | 4/1978 | Chung | |
| 4,910,731 A | 3/1990 | Sakurai et al. | |
| 5,418,964 A | 5/1995 | Conner et al. | |
| 5,815,718 A | 9/1998 | Tock | |
| 5,899,997 A | 5/1999 | Ellacott | |
| 5,920,720 A | 7/1999 | Toutonghi et al. | |
| 6,003,038 A | 12/1999 | Chen | |
| 6,072,953 A | 6/2000 | Cohen et al. | |
| 6,081,665 A | 6/2000 | Nilsen et al. | |
| 6,096,095 A | 8/2000 | Halstead | |
| 6,151,618 A | 11/2000 | Wahbe et al. | |
| 6,151,703 A | 11/2000 | Crelier | |
| 6,163,780 A | 12/2000 | Ross | |
| 6,202,208 B1 * | 3/2001 | Holiday, Jr. ............... | 717/166 |
| 6,205,578 B1 | 3/2001 | Grove | |
| 6,292,883 B1 | 9/2001 | Augusteijn et al. | |
| 6,317,872 B1 | 11/2001 | Gee et al. | |
| 6,330,709 B1 | 12/2001 | Johnson et al. | |
| 6,332,215 B1 | 12/2001 | Patel et al. | |
| 6,338,160 B1 | 1/2002 | Patel et al. | |
| 6,339,841 B1 * | 1/2002 | Merrick et al. ............ | 717/166 |
| 6,372,286 B1 | 4/2002 | Azuma et al. | |

(Continued)

FOREIGN PATENT DOCUMENTS

EP 0810522 A2 12/1997

(Continued)

OTHER PUBLICATIONS

Chilimbi, Trishul M., Davidson, Bob, Larus, James R., "Cache-Conscious Structure Definition", p. 13-24, 1999 ACM, retrieved from ACM Portal database Feb. 3, 2004.*

(Continued)

*Primary Examiner*—Tuan Dam
*Assistant Examiner*—Mary J. Steelman
(74) *Attorney, Agent, or Firm*—Beyer Weaver & Thomas, LLP

(57) ABSTRACT

Improved techniques for loading class files into virtual computing machines are disclosed. These techniques provide a mechanism that will generally improve the efficiency of virtual machines by selectively loading information into a virtual machine. As will be appreciated, this allows a better use of the resources of the virtual machine. This is especially effective in virtual machines that operate with limited memory resources (e.g., embedded systems). In one embodiment, class files suitable for loading into a virtual machine are initially loaded into a memory portion (e.g., heap memory). Then, information that is needed to be loaded into the virtual machine is selected. Finally, only the selected information is loaded into the virtual machine.

21 Claims, 5 Drawing Sheets

U.S. PATENT DOCUMENTS

| | | | |
|---|---|---|---|
| 6,434,694 B1 | 8/2002 | Slaughter et al. | |
| 6,442,753 B1* | 8/2002 | Gerard et al. | 717/170 |
| 6,446,084 B1 | 9/2002 | Shaylor et al. | |
| 6,467,037 B1 | 10/2002 | Griesemer | |
| 6,496,871 B1 | 12/2002 | Jagannathan et al. | |
| 6,553,565 B1 | 4/2003 | Click, Jr. et al. | |
| 6,557,023 B1 | 4/2003 | Taivalsaari | |
| 6,557,054 B1 | 4/2003 | Reisman | |
| 6,571,388 B1* | 5/2003 | Venkatraman et al. | 717/166 |
| 6,584,612 B1* | 6/2003 | Mueller et al. | 717/166 |
| 6,643,711 B1 | 11/2003 | Bracha et al. | |
| 6,704,803 B1 | 3/2004 | Wilson et al. | |
| 6,738,977 B1* | 5/2004 | Berry et al. | 719/332 |

FOREIGN PATENT DOCUMENTS

| | | |
|---|---|---|
| EP | 0943989 A2 | 9/1999 |
| EP | 0 996 059 A2 | 4/2000 |
| WO | WO 99/31576 | 6/1999 |

OTHER PUBLICATIONS

Krintz, Chandra, Calder, Brad, Holzle, Urs, "Reducing Transfer Delay Unisg JAVA Class File Splittingand Prefetching", p. 276-291, 1999 ACM, retrieved from ACM Portal database Feb. 3, 2004.*

Nicol, David, Carr, Eric, "Empirical Study of Parallel Trace-Driven LRU Cache Simulators", p. 166-169, 1995 IEEE, retrieved from IEEE database Feb. 3, 2004.*

"How the Java virtual machine handles method invocation and return", JavaWorld, Jun. 1997, retrieved from google.com search Jan. 19, 2005 □□<URL http://ww.javaworld.com/javaworld/jw-06-1997/jw-06-hood_p.html> .*

Chang, Da-Wei et al., "EJVM: an economic Java run-time environment for embedded devices", *Software Practice and Experience,* 2001, John Wiley & Sons, vol. 31, No. 2, pp. 129-146. XP-000987539.

Gosling, James et al., "The Java™ Language Specification", 1996, *The Java™ Language Specification,* Chapter 12 Execution, pp. 215-236. XP-002032923.

Qian, Zhenyu et al., "A Formal Specification of Java™ Virtual Machine Instructions", 1997, *Technical Report, Universität Bremen,* pp. 1-32. XP-002255760.

Lindholm et al., "The Java Virtual Machine Specification", Sep. 1996.

Case B: "Implementing The Java Virtual Machine *Java's Complex Instruction Set Can Be Built in Software or Hardware,"* Microprocessor Report, vol. 10, No. 4, Mar. 25, 1996, pp. 12-17. XP-000987276.

McNeley KJ et al., "Emulating A Complex Instruction Set Computer With a Reduced Instruction Set Computer," IEEE Micro, IEEE Inc. New York, US, vol. 7, No. 1 Feb. 1987, pp. 60-71. XP-000827611.

Jean-Paul Billon, "JEFFWEG4 (J Executable File Format), Release 1.0 Achievements, Sep. 29, 2000," J Consortium Jeff Working Group, 'Online! Feb. 22, 2001, p. 1-24. XP-002208358.

Jean-Paul Billon, "J Executable File Format (JEFF) Specification, Draft," J Consortium Jeff Working Group, 'Online! Feb. 22, 2001, p. 1-43. XP-002208357.

Patrice Pominville, "Annotating Java Bytecode," Project Report, McGill University, Online, Apr. 2000, pp. 1-7. XP-002254149.

Yourst, "Inside Java Class Files," Dr. Dobb's Journal, Jan. 1998, XP-002254150.

Hummel et al., "Annotating the Java bytecodes in support of optimization," Concurrency: Practice and Experience, John Wiley and Sons, vol. 9(11), Nov. 1997, pp. 1003-1016. XP-001131083.

Lindholm et al., "The Java Virtual Machine Specification," Second Edition, Apr. 1999, pp. 117-132. XP-002254151.

Dahm, Markus, "Byte Code Engineering", 1999, Java Information Tag, Proceedings of JIT' 99: Java-Informations'Tage, Dusseldorf, Germany, vol. 20-21, pp. 267-277, XP-002262007.

Meyer et al., "Java Virtual Machine" O'Reilly & Associates, Inc., 1997. XP-002262008.

* cited by examiner

TECHNIQUES FOR LOADING CLASS FILES INTO VIRTUAL MACHINES

CROSS-REFERENCE TO RELATED APPLICATIONS

This application is related to U.S. patent application Ser. No. 09/703,361, entitled "IMPROVED FRAMEWORKS FOR INVOKING METHODS IN VIRTUAL MACHINES," which is hereby incorporated herein by reference.

This application is related to U.S. patent application Ser. No. 09/703,356, entitled "IMPROVED METHODS AND APPARATUS FOR NUMERIC CONSTANT VALUE INLINING IN VIRTUAL MACHINES," which is hereby incorporated herein by reference.

This application is related to U.S. patent application Ser. No. 09/703,449, entitled "IMPROVED FRAMEWORKS FOR LOADING AND EXECUTION OF OBJECT-BASED PROGRAMS," which is hereby incorporated herein by reference.

BACKGROUND OF THE INVENTION

1. The Field of the Invention

The present invention relates generally to object oriented programming environments. More specifically, the invention relates to improved frameworks for loading class files into virtual computing machines.

2. The Relevant Art

Recently, the Java™ programming environment has become quite popular. The Java™ programming language is an object-based, high level programming language that is designed to be portable enough to be executed on a wide range of computers ranging from small devices (e.g., pagers, cell phones and smart cards) up to supercomputers. Computer programs written in the Java™ programming language (and other languages) may be compiled into Java™ virtual machine instructions (typically referred to as Java™ bytecodes) that are suitable for execution by a Java™ virtual machine implementation.

The Java™ virtual machine is commonly implemented in software by means of an interpreter for the Java™ virtual machine instruction set, but in general may be software, hardware, or both. A particular Java™ virtual machine implementation and corresponding support libraries together constitute a Java™ runtime environment.

Computer programs in the Java™ programming language are arranged in one or more classes or interfaces (referred to herein jointly as classes or class files). Such programs are generally platform independent (i.e., hardware and operating system). As such, these computer programs may be executed unmodified on any computer that is able to run an implementation of the Java™ runtime environment. A class written in the Java™ programming language is compiled to a particular binary format called the "class file format" that includes Java™ virtual machine instructions for the methods of a single class. In addition to the Java™ virtual machine instructions for the methods of a class, the class file format includes a significant amount of ancillary information that is associated with the class. The class file format (as well as the general operation of the Java™ virtual machine) is described in some detail in The Java Virtual Machine Specification by Tim Lindholm and Frank Yellin (ISBN 0-201-31006-6), which is incorporated herein by reference.

Generally, when a class file is loaded into the virtual machine, the virtual machine essentially makes a copy of the class file for its internal use. The virtual machine's internal copy is sometimes referred to as an "internal class representation." In conventional virtual machines, the internal class representation is typically almost an exact copy of the class file. This is true regardless of whether the loaded information is likely to be used or is not used. For example, an exact copy of common Java™ classes (e.g., class PrintWriter), are loaded into the virtual machine. These classes typically have a large size. Thus, a common class, for example, class PrintWriter, may take up as much as 40 KiloBytes (40 K) of memory. However, typically, 90% of the class is not used during the execution of a computer program. This, of course, results in a grossly inefficient use of memory resources. In some circumstances, particularly in embedded systems which have limited memory resources, this inefficient use of memory resources is a significant disadvantage.

To further elaborate, FIG. 1 depicts a representation of a class file 100 inside a virtual machine. The class file 100 includes Methods A–Z portions that correspond to methods associated with a class. In addition, the class data 102 represents class data for the class. As will be appreciated by those skilled in the art, during typical execution of a program, only a small number of methods may be needed, for example, only Methods A and B may be needed. Nevertheless, all the methods associated with a class file are conventionally loaded. Similarly, only a data portion 104 may have been needed, but conventionally, all of the class data 102 is loaded. Thus, conventional techniques result in grossly inefficient use of memory resources which is a significant disadvantage, especially when memory resources are limited.

In view of the foregoing, improved techniques for loading class files into virtual computing machines are needed.

SUMMARY OF THE INVENTION

To achieve the foregoing and other objects of the invention, improved techniques for loading class files into virtual computing machines are disclosed. One aspect of the present invention seeks to provide a mechanism that will generally improve the efficiency of virtual machines by selectively loading information into a virtual machine. In other words, unlike conventional techniques where the entire class file is substantially loaded into the virtual machine, the inventive techniques can operate to load only a portion of the class file. As will be appreciated, this allows a better use of the resources of the virtual machine. The inventive mechanisms are especially effective in virtual machines that operate with limited memory resources (e.g., embedded systems). In one embodiment, class files suitable for loading into a virtual machine are initially loaded into a memory portion (e.g., heap memory). Then, information that is needed to be loaded into the virtual machine is selected. Finally, only the selected information is loaded into the virtual machine.

The invention can be implemented in numerous ways, including as a method, an apparatus, a computer readable medium, and a database system. Several embodiments of the invention are discussed below.

As a method for loading a class file into a virtual machine, one embodiment of the invention includes the acts of: loading the class file into a memory portion of the computing system; selecting information from the class file to be loaded into the virtual machine; and loading the selected information from the memory portion into the virtual machine and not loading information not selected from the class file into the virtual machine.

As another method for loading a class file into a virtual machine, another embodiment of the invention include the act of: encountering a request to use at least one method of a class associated with a class file; determining whether the class file exists in a dedicated heap memory portion; loading the class file in the dedicated heap memory portion when the determining determines that the class file does not exist in the dedicated heap memory portion; selecting information associated with the at least one method of the class; determining whether an internal representation of the class file exists in the virtual machine; creating an internal representation of the class file in the virtual machine when the determining determines that an internal representation of the class file does not exist in the virtual machine; and loading into the virtual machine the selected information associated with the at least one method of the class and not loading into the virtual machine information that was not selected.

As a computer readable media, including computer program code for loading a class file into a virtual machine, one embodiment of the invention includes: computer program code for loading the class file into a memory portion of the computing system; computer program code for selecting information from the class file to be loaded into the virtual machine; and computer program code for loading the selected information from the memory portion into the virtual machine and not loading information not selected from the class file into the virtual machine.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java™ programming environment has enjoyed widespread success. Therefore, there are continuing efforts to extend the breadth of Java™ compatible devices and to improve the performance of such devices. One of the most significant factors influencing the performance of Java™ based programs on a particular platform is the performance of the underlying virtual machine. Accordingly, there have been extensive efforts by a number of entities to provide improved performance to Java™ compliant virtual machines. In order to be Java™ compliant, a virtual machine must be capable of working with Java™ classes which have a defined class file format. Although it is important that any Java™ virtual machine be capable of handling Java™ classes, the Java™ virtual machine specification does not dictate how such classes are represented internally within a particular Java™ virtual machine implementation.

The present invention pertains to improved frameworks for loading class files into virtual computing machines. One aspect of the present invention seeks to provide a mechanism that will generally improve the efficiency of virtual machines by selectively loading information into a virtual machine. In other words, unlike conventional techniques where the entire class file is substantially loaded into the virtual machine, the inventive techniques can operate to load only a portion of the class file. As will be appreciated, this allows for a better use of the resources. The inventive mechanisms are especially effective in virtual machines that operate with limited memory resources (e.g., embedded systems). In one embodiment, class files suitable for loading into a virtual machine are initially loaded into a memory portion (e.g., heap memory). Then, information that is needed to be loaded from the class file into the virtual machine is selected. Finally, only the selected information from the class file is loaded into the virtual machine.

Embodiments of the invention are discussed below with reference to FIGS. 2–4. However, those skilled in the art will readily appreciate that the detailed description given herein with respect to these figures is for explanatory purposes as the invention extends beyond these limited embodiments.

Figure 1:
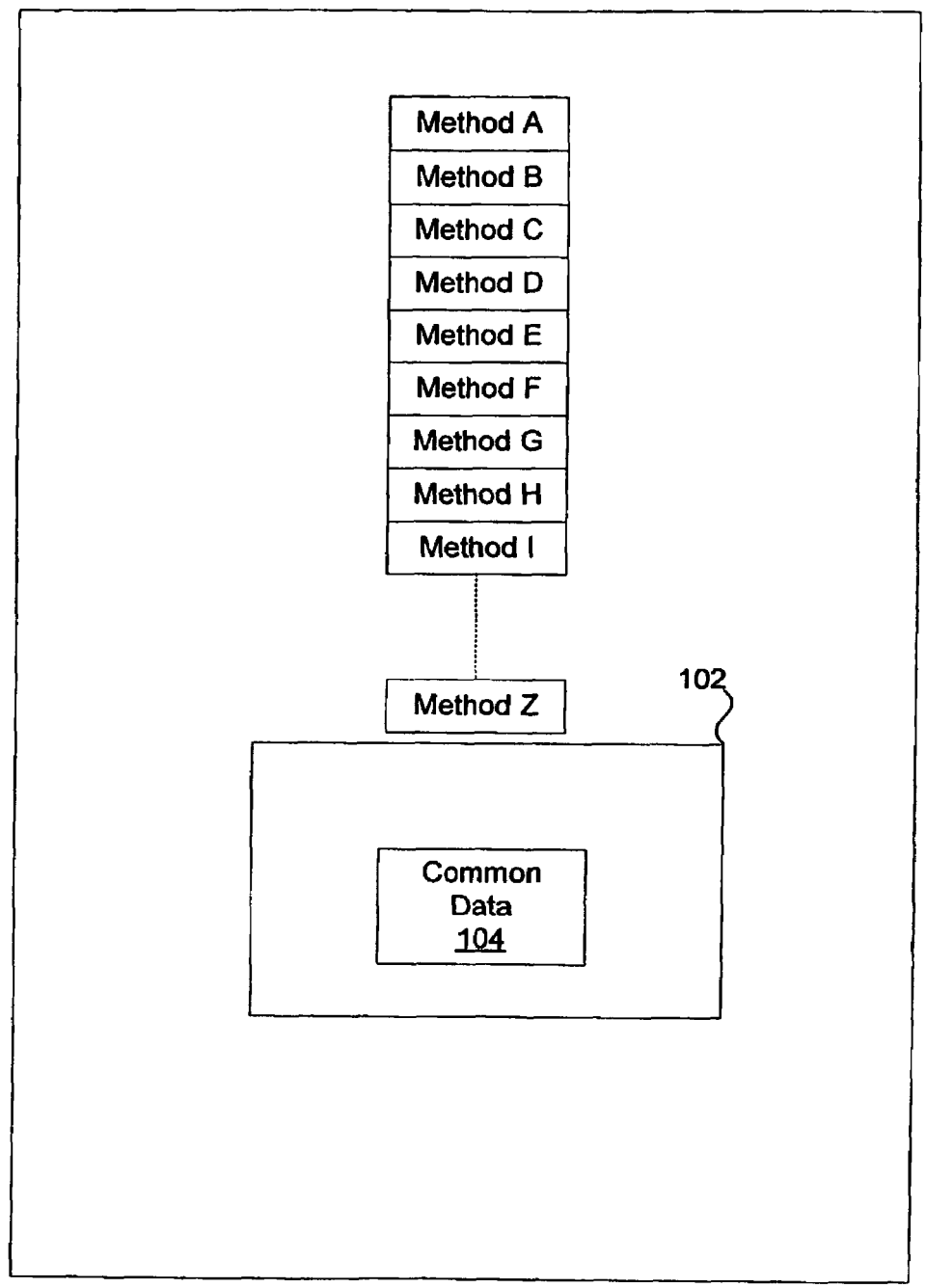
FIG. 1 depicts a representation of a class file inside a virtual machine.
Figure 2:
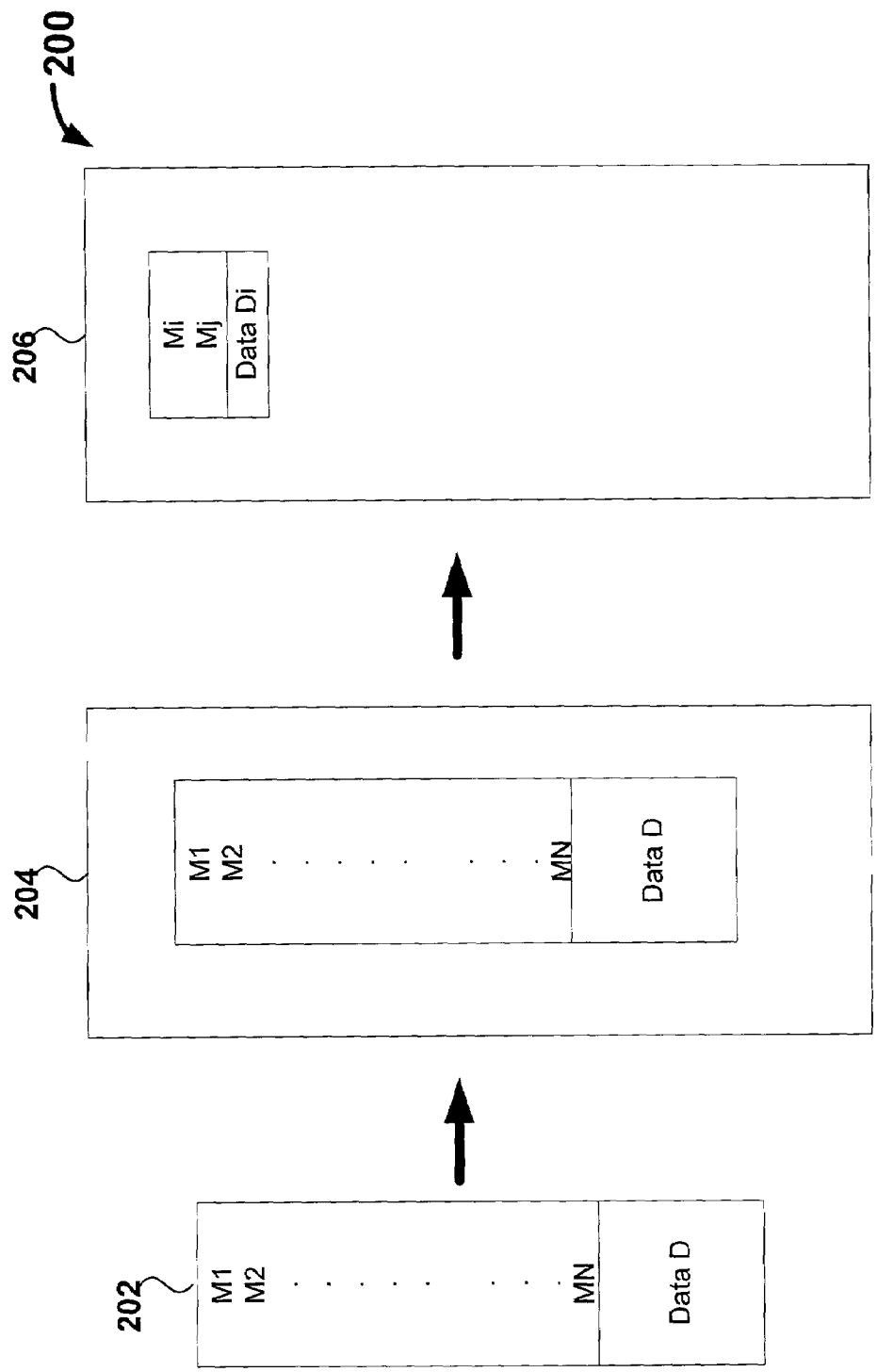
FIG. 2 illustrates an object-oriented programming environment in accordance with one embodiment of the invention.

FIG. 2 is a representation of an object-oriented computing environment 200 in accordance with one embodiment of the invention. The object-oriented computing environment 200 includes a class file 202, a raw-class heap portion 204, and an internal class representation 206 of the class file 202. The internal class representation 206 illustrates the information that is loaded in a virtual machine operating in the object-oriented computing environment 200.

As shown in FIG. 2, the class file 202 can include associated Methods $M_1$–$M_n$, as well as a data portion D. The class file 202 can be resident, for example, on a computer readable medium (e.g., compact disk, floppy disk, etc.) Furthermore, as will be appreciated, the class file 202 may be located anywhere in a distributed computing environment. Accordingly, in a distributed computing environment, the class file 202 may be transferred over a computer network from a remote location and can then be loaded into the virtual machine.

The raw-class heap portion 204 represents a portion of the memory of the object oriented computing environment 200 that is used to initially load the class file 202. This memory can be, for example, a memory portion of the object-oriented computing environment 200 that is dedicated to loading class files (i.e., dedicated memory). In contrast, the internal class representation 206 illustrates the information that is actually loaded inside the virtual machine. In this example, only the Methods $M_i$ and $M_j$ of the Methods $M_1$–$M_n$ have been loaded into the virtual machine. Similarly, only a portion Di of the class data D is loaded into the virtual machine. Furthermore, as will be appreciated by those skilled in the art, maintenance can be performed on raw-class heap portion 204. For example, class files can be removed from the raw-class heap portion 204 on a Least Recently Used (LRU) basis.

Figure 3:
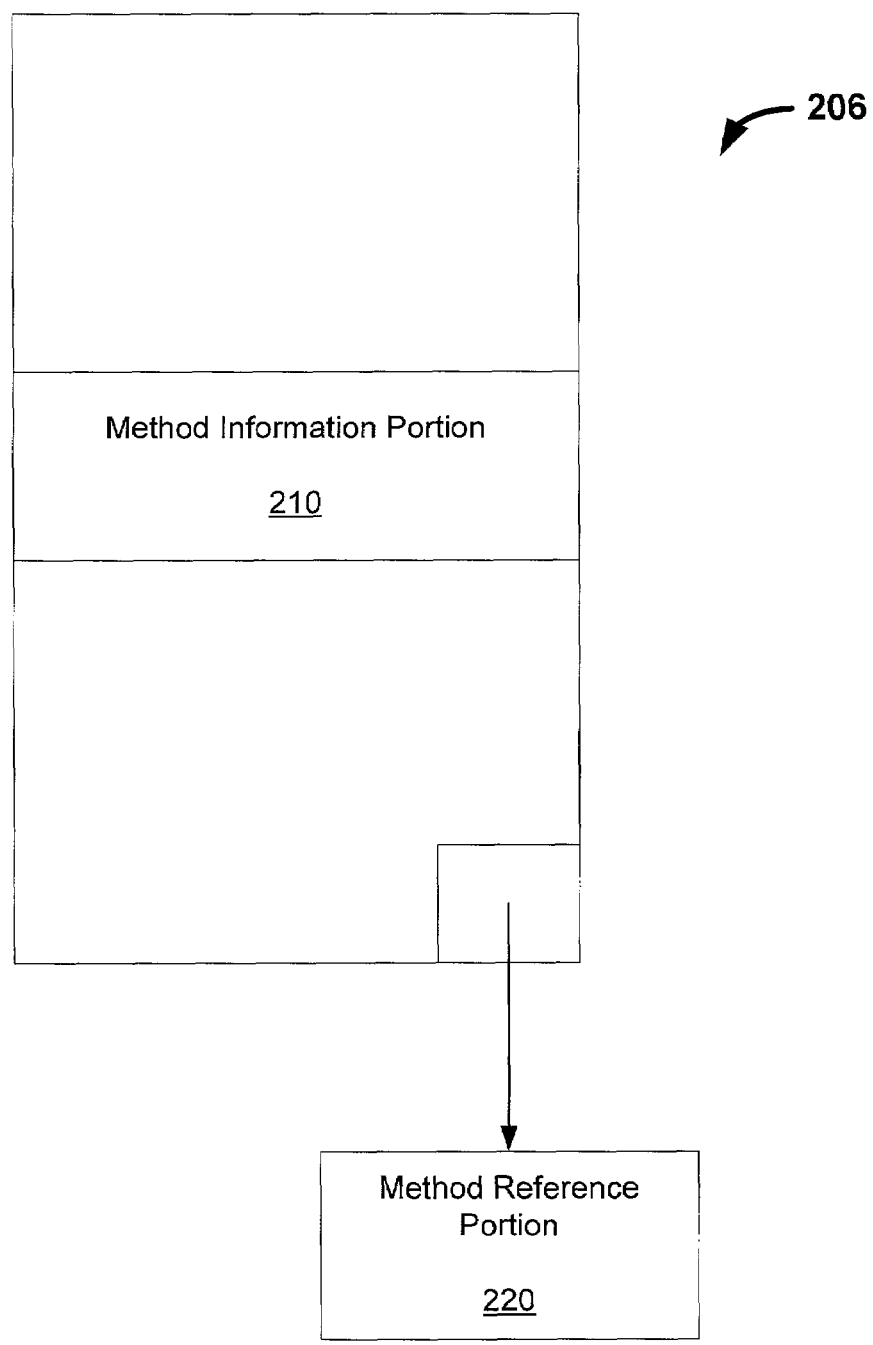
FIG. 3 is a block diagram of the internal class representation in accordance with one embodiment of the invention.
Figure 4:
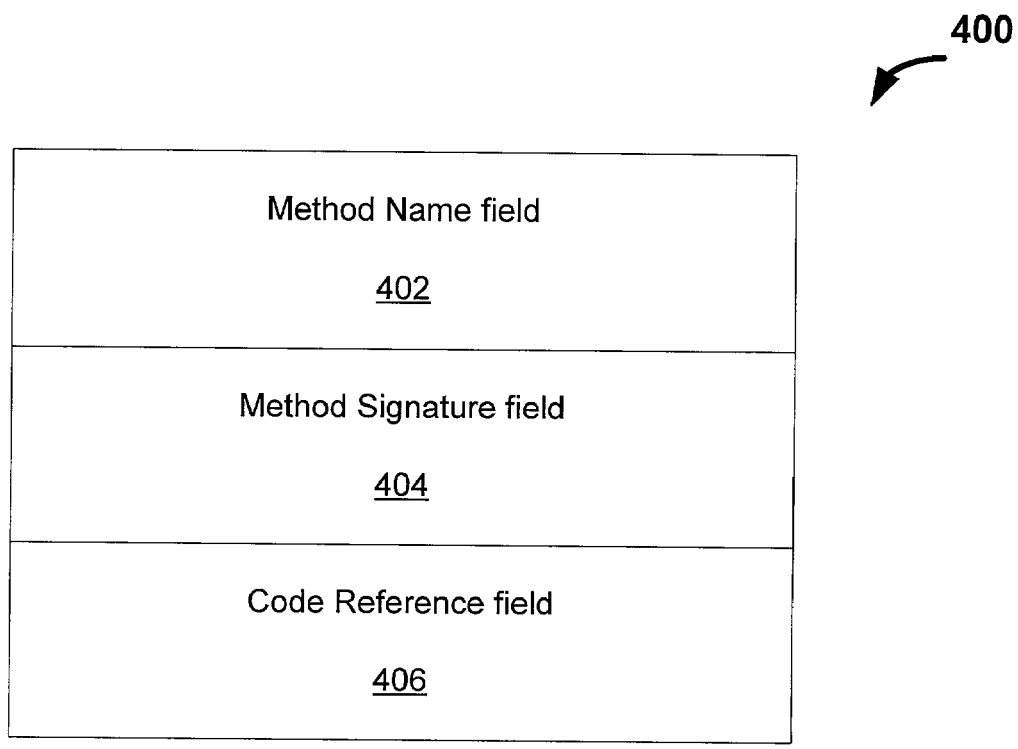
FIG. 4 is a diagrammatic representation of a reference cell in accordance with one embodiment of the present invention.

FIG. 3 is a block diagram of the internal class representation 206 in accordance with one embodiment of the invention. The internal class representation 206 can be, for example, implemented as a data structure embodied in a computer readable medium that is suitable for use by a virtual machine. As shown in FIG. 3, the internal class representation 206 includes a method information portion 210. The method information portion 210 can be arranged to contain or reference information relating to one or more methods. These methods can be, for example, Java™ implemented methods. Furthermore, as will be appreciated, the method information portion 210 can be implemented in various ways, for example, as a table similar to a table of method information implemented in a standard Java™ class file.

In addition to the method information potion 210, the internal class representation 206 includes a method reference portion 220 associated with the methods contained within the internal class representation 206. The method reference portion 220 can be arranged to include any reference cell associated with the class. Again, as will be appreciated, the method reference portion 220 can be implemented in a wide variety of different ways depending on the needs of a particular system. By way of example, in one embodiment, the reference cells are linked together using a link-list construct. Each reference cell can include information that is useful in invoking a method.

It should be noted that reference cells are created selectively (e.g., when it is certain and/or when it is likely that a method is to be invoked). Accordingly, in accordance with one embodiment of the invention, if a method does not appear to be invoked, reference cells corresponding to that method are not created. As a result, processing time and memory space may further be improved.

As noted above, the method reference portion 220 of FIG. 3 can be arranged to include any reference cell associated with the class. FIG. 4 is a diagrammatic representation of a reference cell 400 in accordance with one embodiment of the present invention. In the illustrated embodiment, the reference cell 400 includes a method name field 402, a method signature field 404, and a code reference field 406. Typically, a value stored in one of the fields 402, 404, and 406 can be referenced (i.e., point to another value). As noted above, a class may have one or more methods associated with it. A class can have one or more corresponding reference cells, for example, the reference cell 300. The method name field 402 is arranged to identify the name of a method associated with the class. This is typically done by storing the actual method name in the method name field 402. However, again, this can also be accomplished by storing a reference or index to the method name.

The signature field 404 is arranged to contain or reference a signature associated with the method corresponding the reference cell. The nature of the signature is well known to those familiar with method invocation in Java™ virtual machines. Typically, in most conventional Java™ virtual machines, the signature is constructed into a form usable by the virtual machine using a series of calls to the constant pool at runtime when the method is invoked. Although this works well, it is relatively slow. One advantage to including the signature in the reference cell is that a signature suitable for direct use by the virtual machine can be constructed during loading and either stored directly in the reference cell or stored in a location that is referenced by the reference cell. In the described embodiment, the reference cell contains a reference (e.g., pointer or index) to the signature rather than actually storing the signature, simply because signatures can be relatively large and their relative sizes may vary significantly for different classes. In addition, references to signatures can be used across reference cells. Thus, referencing the signature tends to be a more efficient use of memory. More details about internal representation of methods can be found in related U.S. patent application Ser. No. 09/703,361, entitled "IMPROVED FRAMEWORKS FOR INVOKING METHODS IN VIRTUAL MACHINES," U.S. patent application Ser. No. 09/703,356, entitled "IMPROVED METHODS AND APPARATUS FOR NUMERIC CONSTANT VALUE INLINING IN VIRTUAL MACHINES," and U.S. patent application Ser. No. 09/703,449, entitled "IMPROVED FRAMEWORKS FOR LOADING AND EXECUTION OF OBJECT-BASED PROGRAMS," all of which are hereby incorporated herein by reference.

Finally, the code reference field 406 is arranged for referencing the code associated with the method. As will be appreciated by those skilled in the virtual machine art, there is often code associated with a method that the virtual machine executes at runtime. The code reference field 406 simply provides a place to identify the location where such information can be or is stored. It should also be noted that the code reference field 406 can be loaded when it is determined that there is a need for the code. Similarly, method name field 402 and method signature field 404 can selectively be loaded.

Figure 5:
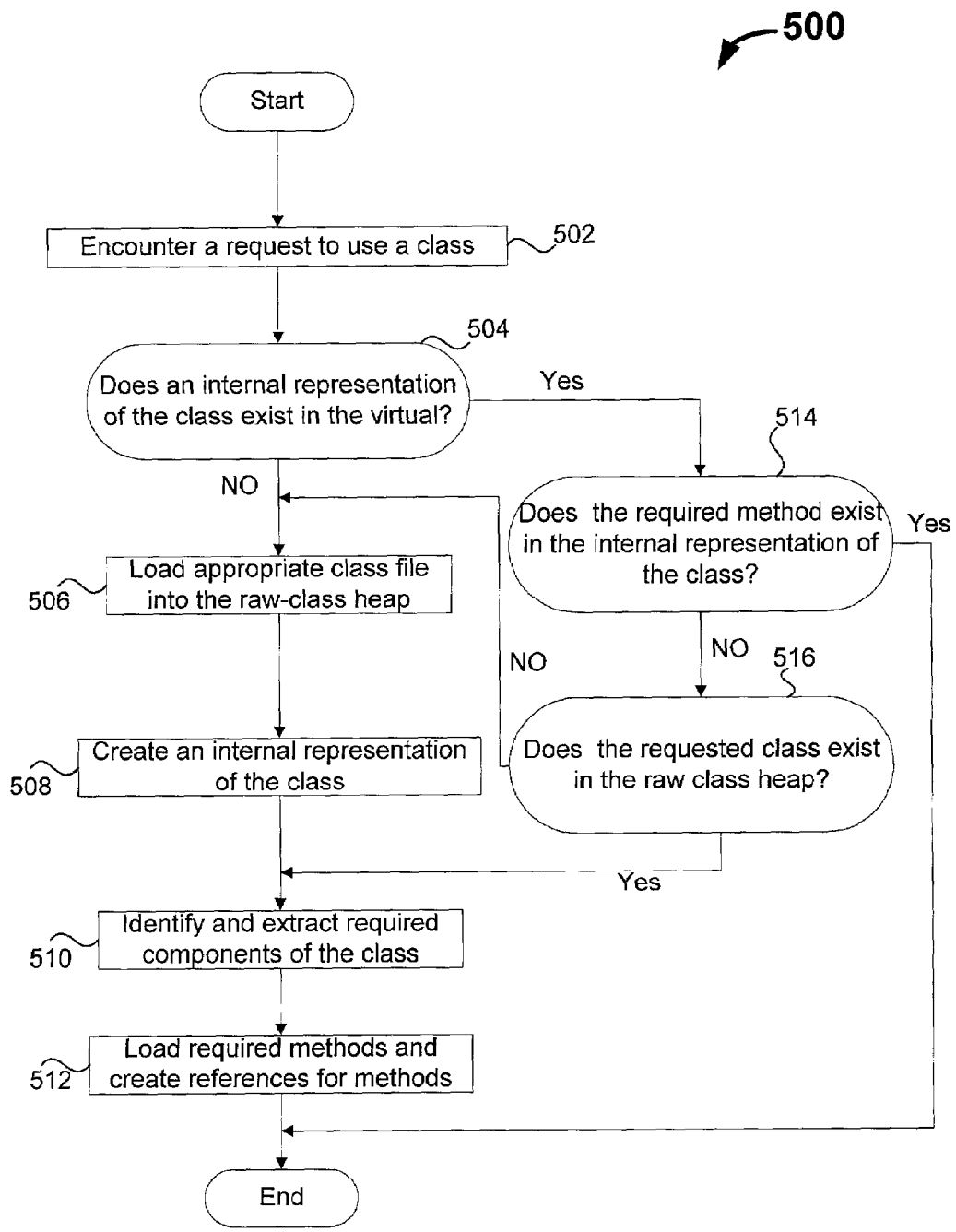
FIG. 5 illustrates an exemplary loading method for loading a class file in accordance with one embodiment of the invention.

FIG. 5 illustrates an exemplary loading method 500 for loading a class file in accordance with one embodiment of the invention. The method 500 can be implemented in an object oriented computing environment to selectively load class files into a virtual machine. For the sake of illustration, in the described embodiment, the loading method 500 is used in a Java™ runtime environment to load a Java™ class file. Initially, at operation 502, a request to use a class is encountered. Next, at operation 504, a determination is made as to whether an internal representation of the class exists in the virtual machine. If it is determined at operation 504 that an internal class representation does not exist for the class, the method 500 proceeds to operation 506 where the appropriate class file (i.e., class file associated with the class) is loaded into the raw-class heap. After the appropriate class file is loaded into the raw-class heap, at operation 508, an internal representation of the class is created. This internal representation can be, for example, the internal representation 206 illustrated in FIG. 3. Next, at operation 510, the required components of the class are identified and extracted from the raw-class heap. As will be appreciated, these components can be selected, for example, when the class is resolved. Accordingly, only the required components of the class need to be extracted after being identified. Thereafter, the extracted components of the class are loaded into the virtual machine at operation 512. This can include loading required methods and creating references for loaded methods in a method information portion (e.g., similar to a method table implemented in a standard Java™ class). The method 500 ends following operation 512.

On the other hand, if it is determined at operation 504 that an internal class representation exists for the class, the method 500 proceeds to operation 514 where a determination is made as to whether a requested method of the class already exists in the internal class representation in the virtual machine. If it is determined at operation 514 that the requested method of the class already exists in the internal class representation in the virtual machine, the method 500 ends. However, if it is determined at operation 514 that the requested method does not exist in the raw-class heap, the method 500 proceeds to operation 516 where it is determined whether the requested class exists in the raw-class heap. If it is determined at operation 514 that the requested method does not exist, the method 500 proceeds to operation 506 where the appropriate class file is loaded in the raw-class heap. However, if it is determined at operation 516 that the requested class exists in the raw-class heap, the method 500 proceeds directly to operation 510, bypassing operations 506 and 508. At operation 510, the required components of the class are identified and extracted from the raw-class heap. Thereafter, the extracted components of the class can be loaded into the virtual machine at operation 512. As noted above, this can include loading required methods and creating references for loaded methods in a method information portion (e.g., similar to a method table implemented in a standard Java™ class). The method 500 ends following operation 512.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of loading a class file into a virtual machine, said class file being associated with a class, and said virtual machine operating in an object- oriented computing system, said method comprising:

loading said class file into a memory portion of the computing system, wherein said loading operates to copy said class file in its entirety into said memory portion prior to further processing said class file;

selecting information from said class file in said memory portion after said class file has been loaded into said memory portion, wherein said selecting operates to select at least a plurality of selected methods which are to be loaded into said virtual machine;

loading said selected information from said class file in said memory portion into said virtual machine and not loading information which has not been selected from said class file into said virtual machine;

generating an internal representation for said plurality of selected methods which are to be loaded in the virtual machine, wherein said internal representation includes a method information portion and a method reference portion, said method information portion providing information about said plurality of selected methods and said method reference portion information providing information which can be used to invoke said plurality of selected methods, and wherein said method reference portion comprises a list, representing all of said plurality of selected methods, which is arranged as a sequence of reference cells each representing one of said plurality of selected methods, wherein each of said reference cells includes a method name field, a method signature field, and a method code field respectively providing a name, a signature, and a reference to code of a method, thereby allowing a first selected method of said selected plurality methods to be invoked by accessing said method reference portion and identifying a first reference cell associated with said first selected method.

2. A method as recited in claim 1, wherein said loading of only said selected information operates to populate said method name field, method signature field, and method code field with information or references to information.

3. A method as recited in claim 1, wherein said memory is a heap memory of said computing system.

4. A method as recited in claim 1, wherein the method further comprises:

determining whether an internal representation of the class file exists in the virtual machine; and creating an internal representation of the class file in the virtual machine when said determining determines that an internal representation of the class file does not exist in the virtual machine.

5. A method as recited in claim 1, wherein the method further comprises:

determining whether said class file exists in said memory portion; and loading said class file in said memory portion when said determining determines that said class file does not exist in said memory portion.

6. A method as recited in claim 1, wherein the method further comprises:

removing said class file from said memory portion.

7. A method as recited in claim 6, wherein said removing is performed on a Least Recently Used basis.

8. A computer readable medium including computer program code for loading a class file into a virtual machine, said class file being associated with a class, and said virtual machine operating in an object-oriented computing system, said method comprising:

computer program code for loading said class file into a memory portion of the computing system, wherein said loading operates to copy said class file in its entirety into said memory portion prior to further processing said class file;

computer program code for selecting information from said class file in said memory portion after said class file has been loaded into said memory portion, wherein said selecting operates to select at least a plurality of selected methods which are to be loaded into said virtual machine;

computer program code for loading said selected information from said class file in said memory portion into said virtual machine and not loading information which has not been selected from said class file into said virtual machine;

computer program code for generating an internal representation for said plurality of selected methods which are to be loaded in the virtual machine, wherein said internal representation includes a method information portion and a method reference portion, said method information portion providing information about said plurality of selected methods and said method reference portion information providing information which can be used to invoke said plurality of selected methods, and wherein said method reference portion comprises a list, representing all of said plurality of selected methods, which is arranged as a sequence of reference cells each representing one of said plurality of selected methods, wherein each of said reference cells includes a method name field, a method signature field, and a method code field respectively providing a name, a signature, and a reference to code of a method, thereby allowing a first selected method of said selected plurality of methods to be invoked by accessing said method reference portion and identifying a first reference cell associated with said first selected method.

9. A computer readable medium as recited in claim 8, wherein said loading of only said selected information operates to populate said method name field, method signature field, and method code field with information or references to information.

10. A computer readable medium as recited in claim 8, wherein said memory is a heap memory of said computing system.

11. A computer readable medium as recited in claim 8, wherein the method further comprises:
   determining whether an internal representation of the class file exists in the virtual machine; and
   creating an internal representation of the class file in the virtual machine when said determining determines that an internal representation of the class file does not exist in the virtual machine.

12. A computer readable medium as recited in claim 8, wherein the method further comprises:
   determining whether said class file exists in said memory portion; and
   loading said class file in said memory portion when said determining determines that said class file does not exist in said memory portion.

13. A computer readable medium as recited in claim 8, wherein the method further comprises:
   removing said class file from said memory portion.

14. A computer readable medium as recited in claim 8, wherein said removing is performed on a Least Recently Used basis.

15. A computer system for loading a class file into a virtual machine, said class file being associated with a class of an object-oriented computer programming language, wherein said computer system comprises:
   memory;
   at least one processor configured to access said memory and operating to:
      load a class file into a virtual machine, said class file being associated with a class, and said virtual machine operating in an object-oriented computing system, said method comprising:
      load said class file into a memory portion of the computing system, wherein said loading operates to copy said class file in its entirety into said memory portion prior to further processing said class file;
      select information from said class file in said memory portion after said class file has been loaded into said memory portion, wherein said selecting operates to select at least a plurality of selected methods which are to be loaded into said virtual machine;
      load said selected information from said class file in said memory portion into said virtual machine and not loading information which has not been selected from said class file into said virtual machine;
      generate an internal representation for said plurality of selected methods which are to be loaded in the virtual machine, wherein said internal representation includes a method information portion and a method reference portion, said method information portion providing information about said plurality of selected methods and said method reference portion information providing information which can be used to invoke said plurality of selected methods, and
      wherein said method reference portion comprises a list, representing all of said plurality of selected methods, which is arranged as a sequence of reference cells each representing one of said plurality of selected methods, wherein each of said reference cells includes a method name field, a method signature field, and a method code field respectively providing a name, a signature, and a reference to code of a method, thereby allowing a first selected method of said selected plurality of methods to be invoked by accessing said method reference portion and identifying a first reference cell associated with said first selected method.

16. A computer system as recited in claim 15, wherein said loading of only said selected information operates to populate said method name field, method signature field, and method code field with information or references to information.

17. A computer system as recited in claim 15, wherein said memory is a heap memory of said computing system.

18. A computer system as recited in claim 15, wherein the method further comprises:
   determining whether an internal representation of the class file exists in the virtual machine; and
   creating an internal representation of the class file in the virtual machine when said determining determines that an internal representation of the class file does not exist in the virtual machine.

19. A computer system as recited in claim 15, wherein the method further comprises:
   determining whether said class file exists in said memory portion; and
   loading said class file in said memory portion when said determining determines that said class file does not exist in said memory portion.

20. A computer system as recited in claim 15 wherein the method further comprises:
   removing said class file from said memory portion.

21. A method as recited in claim 20, wherein said removing is performed on a Least Recently Used basis.

\* \* \* \* \*

UNITED STATES PATENT AND TRADEMARK OFFICE
CERTIFICATE OF CORRECTION

| | | |
|---|---|---|
| PATENT NO. | : 7,020,874 B2 | |
| APPLICATION NO. | : 09/818097 | |
| DATED | : March 28, 2006 | |
| INVENTOR(S) | : Sokolov et al. | |

It is certified that error appears in the above-identified patent and that said Letters Patent is hereby corrected as shown below:

In the Claims:

In line 35 of claim 1 (column 7, line 56) add --of-- after "plurality".

Signed and Sealed this

Fifth Day of September, 2006

JON W. DUDAS
*Director of the United States Patent and Trademark Office*